(12) United States Patent
Myers (10) Patent No.: US 11,305,287 B2
(45) Date of Patent: Apr. 19, 2022

(54) WATER TESTING APPARATUS AND METHODS OF USING THE SAME

(71) Applicant: ENVIRONMENTAL LABORATORIES, INC., Madison, IN (US)

(72) Inventor: Chris Myers, Madison, IN (US)

(73) Assignee: Environmental Laboratories, Inc., Madison, IN (US)

( * ) Notice: Subject to any disclaimer, the term of this patent is extended or adjusted under 35 U.S.C. 154(b) by 268 days.

(21) Appl. No.: 15/742,196

(22) PCT Filed: Jul. 11, 2016

(86) PCT No.: PCT/US2016/041727
§ 371 (c)(1),
(2) Date: Jan. 5, 2018

(87) PCT Pub. No.: WO2017/008071
PCT Pub. Date: Jan. 12, 2017

(65) Prior Publication Data
US 2018/0193832 A1    Jul. 12, 2018

Related U.S. Application Data

(60) Provisional application No. 62/190,555, filed on Jul. 9, 2015.

(51) Int. Cl.
*B01L 3/00* (2006.01)

(52) U.S. Cl.
CPC ....... *B01L 3/50825* (2013.01); *B01L 3/50853* (2013.01); *B01J 2219/00596* (2013.01); *B01L 2200/141* (2013.01); *B01L 2200/16* (2013.01); *B01L 2300/042* (2013.01)

(58) Field of Classification Search
None
See application file for complete search history.

(56) References Cited

U.S. PATENT DOCUMENTS

| | | | |
|---|---|---|---|
| 4,868,110 A * | 9/1989 | DesRosier | C12M 23/08 435/34 |
| 5,411,867 A * | 5/1995 | Chang | C12Q 1/10 435/18 |
| 5,605,812 A | 2/1997 | Zomer | |
| 5,726,031 A | 3/1998 | Roth et al. | |
| 2005/0023238 A1 | 2/2005 | Wong | |
| 2010/0311062 A1 | 12/2010 | Vatta et al. | |
| 2012/0115216 A1* | 5/2012 | Sharpin | C12Q 1/08 435/288.7 |
| 2014/0193848 A1 | 7/2014 | Kaufman | |
| 2014/0234950 A1 | 8/2014 | Wolters et al. | |

OTHER PUBLICATIONS

Turgay et al., KSU J. Nat. Sci. 18(1): 31-34 (2015).*
PCT Search Report and Written Opinion for PCT/US2016/041727, completed Aug. 29, 2016.

* cited by examiner

*Primary Examiner* — Erin M. Bowers
(74) *Attorney, Agent, or Firm* — Barnes & Thornburg LLP (57) ABSTRACT

An apparatus and kit for performing water testing and a method for using the same.

22 Claims, 5 Drawing Sheets

SAMPLING & TESTING INSTRUCTIONS
Test Kit
Bacteria in Water Individual Test - (Total Coliform & *E. coli*)
(*Results as fast as 24-hours)

Please read these instructions carefully before collecting your water sample.

CONTENTS NEEDED FOR THIS TEST:
- 1 large - sample vial with White "Tamper Evident" Cap, (Contains Media) – (    Test Kit for Bacteria).
- sampling & testing instructions.

TEST KIT – Large Vial with White "Tamper Evident" Cap, (Contains Media):
- Frequency of Testing: The frequency of testing for bacteria should be based on the history (good or bad) of the water supply. Testing for bacteria in drinking water is recommended at least twice annually; once during the wet season and once during the dry season.
- Warnings: Please keep out of reach of children. Do not ingest contents at any time. Discard contents as noted below.
- Do Not touch, the mouth of the vial or inside of the cap. Do Not rinse vial out before testing or your test result may not be valid.
- Do Not fill the vial above the level noted below, as this may cause your test result to be inaccurate.
- Incubate your water sample at temperatures in the following ranges. (70° - 95°F or 21° – 35°C).
- **\*Results may vary!** When temperatures closer to 95°F (35°C) are sustained during the incubation period (and/or) higher numbers of bacteria are present, test results for bacteria may be completed within 24 hours (± 4 hours). Lower incubation temperatures (and/or) lower bacteria numbers may cause final results to take up to 96 hours. (See webpage & videos to learn more at envirotestkits.com/ kit).

INSTRUCTIONS FOR    TEST KIT – Large Vial with White "Tamper Evident" Cap, (Contains Media):
1. Read and follow these instructions closely. Videos about this test kit are available for your benefit. To learn more, go to envirotestkits.com/ kit and then select one of the videos titled "    Bacteria in Water Test Kit".
2. Wash your hands before starting. Remove the large vial with the white "tamper evident" cap from the package and set it upright.
3. When sampling from a faucet: Do Not overflow the vial!
   - Turn on cold water and allow it to run for approximately five minutes before sampling.
   - Reduce the flow of water to about the diameter of a pencil. Remove the white cap completely. Tilt the vial slightly and slowly fill the vial to the 25 mL mark near the top. Do Not Fill Past This Mark!
4. When sampling from a non-domestic source (lake, stream, cistern, etc.): Do Not overflow the vial!
   - Remove the white cap completely. Tilt the vial slightly and partially submerge the vial. Slowly fill the vial to the 25 mL mark near the top. Do Not Fill Past This Mark!
5. Tightly screw the cap on the vial and shake well, making sure that the media in the vial dissolves completely.
6. Incubation: Store vial in an upright position in a warm area, between 70° - 95°F (21° - 35°C) until test's result is evident. Shaking the vial for 5-10 seconds (every 12 hours) can enhance color development. A counter-top indoors or flat surface outdoors in a low-light area and at noted temperatures, is acceptable for incubation. Keep out of direct sunlight. This kit is designed to be used in remote areas (at room temperatures) without the use of commercial incubators. However, a sustainable optimum temperature is possible when using an incubator. The optimal temperature for incubation is 95.0°F (35.0°C) plus or minus 0.5°. We only recommend incubators when shorter incubation times are desired or if you intend to perform tests frequently. These incubators are available online and are quite affordable.
7. After proper incubation time has elapsed and results are evident, without opening the vial, observe the color of the liquid.
   - Yellow = Absent (negative result for coliform bacteria), coliform bacteria, including *E. coli* bacteria are absent.
   - Blue = Present (positive result for coliform bacteria), potentially harmful bacteria are present, which could include *E. coli*.
   - ***E. coli* confirmation:** *This step is optional for those customers who choose to own a qualified UV lamp; (a 365-nm long-wave UV lamp, with a 6-watt fluorescent bulb).* Hold the vial which is positive for coliform bacteria, underneath the UV lamp's bulb. Do Not point, the lamp at your eyes and never look directly into the lamp itself. If the vial glows a florescent blue color while you are holding it under the UV lamp, then it is positive for *E. coli*. If no fluorescent glow is noted, the sample is absent for *E. coli*.
8. Open vial and discard liquid into toilet. Place a few drops of household bleach into the vial, cap it, shake it, and once again discard the contents into the toilet. Recap the vial. Place the vial in a trash can. Wash your hands thoroughly with soap and warm water.

RESULTS: Please note that this is a    test kit for bacteria. The results of this test are quite accurate but are simply a "Presence/Absence" indicator of bacteria. Our scientists have collaborated with some of the top water-scientists from around the globe. In turn, you can have confidence that you have purchased the very best product available for    bacteria testing. Our test kit is proven to provide the optimum volume for faster and more accurate results. A blue color indicates that you have coliform bacteria present in your water, which could include *E. coli* which is potentially harmful. *E. coli* is best identified by a trained eye, in combination with specialized equipment. If you anticipate frequent testing for bacteria or desire faster results, you may choose to purchase this specialized equipment online. If you do not desire to purchase this equipment, but you desire a confirmation test from a certified laboratory following your    Bacteria in Water test kit results, we are happy to help. Simply go to envirotestkits.com. You can purchase one of our "Certified Lab Testing" Kits for Bacteria online. These specialized kits will allow you to collect a sample and return it to us for testing in our certified laboratory, for coliform bacteria and *E. coli*. Thank you for choosing

WATER TESTING APPARATUS AND METHODS OF USING THE SAME

CROSS REFERENCE TO RELATED APPLICATIONS

This application is a national stage entry under 35 U.S.C. § 371(b) of PCT International Application No. PCT/US2016/041727, filed Jul. 11, 2016, which claims priority under 35 U.S.C. § 119(e) to U.S. Provisional Application Ser. No. 62/190,555, filed Jul. 9, 2015, the disclosures of both of which are expressly incorporated herein by reference in their entireties.

TECHNICAL FIELD

The present disclosure relates to an apparatus, a kit, and one or more methods used for testing and detection of contaminants in water, such as drinking water. More specifically, the present disclosure pertains to an apparatus, such as a vial, used for testing and detection of contaminants in drinking water samples, and one or more methods for using the same. Water contaminants of the present disclosure comprise numerous bacterial strains, including members of the coliform group, including total coliforms, such as E. coli.

BACKGROUND

While the United States (U.S.) Environmental Protection Agency (EPA) regulates all public drinking water systems, roughly 15% of Americans (i.e., 45 million people) rely on unregulated, private ground water wells. The U.S. EPA and the Centers for Disease Control (CDC) recommend that drinking water from private wells be tested for the presence of bacteria and other common contaminants at least once a year (preferably once in the wet season, such as late Spring or once in the dry season, such as early Summer), or anytime that work has been done to the water supply system. If any problems are experienced near the well, such as heavy rains, flooding, land disturbances, or changes in nearby farming practices or waste disposal sites, or if at any time there is a noticeable change in the water (e.g., taste, odor, or color), both the U.S. EPA and CDC recommend that well water be tested for contamination.

Access to clean drinking water is an even larger problem in the developing world than in the United States. According to the World Health Organization (WHO), 1.8 billion people globally use a drinking water source that is contaminated with feces. Roughly 1.5 million people die each year due to diarrheal diseases caused by bacteria, such as cholera and E. coli, resulting in significant morbidity. An estimated 58% of those deaths are attributed specifically to unsafe water supply, often due to bacterial contamination of drinking water.

Coliform bacteria, a group of rod-shaped Gram-negative non-spore forming bacteria, are the most commonly found contaminant in private wells, according to the Indiana State Department of Health (ISDH). Some common genera of the contaminant group include, but are not limited to, *Citrobacter, Enterobacter, Hafnia, Klebsiella*, and *Escherichia*. Coliform bacteria are found in large numbers in the digestive tract of birds and mammals, and are also found in the soil, on plants, and in surface water.

Figure 1:
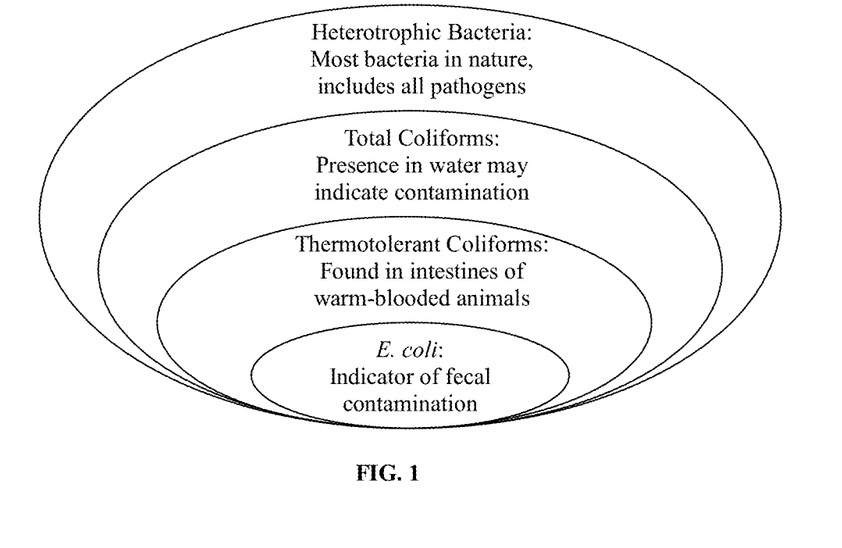
FIG. 1. Diagram of the relationships between common bacterial water contaminants, such as the coliform group and *E. coli*.

Most species within the coliform group, with the exception of the fecal coliforms, are also known as thermotolerant coliforms, and are not typically pathogenic (see FIG. 1). However, a few thermotolerant coliforms can cause opportunistic infections in infants, young children, the elderly, and the immunocompromised. While thermotolerant coliforms (see FIG. 1) are more commonly, but less accurately, known as fecal coliforms, presence of coliform bacteria in drinking water or well water usually indicate an unsanitary condition and possible fecal contamination.

In some cases coliform bacteria are found in the plumbing equipment or on the well mechanisms, and not necessarily in the water supply itself. Despite the fact that most coliform species are not pathogenic or inherently dangerous, they are typically present in higher numbers than pathogens, and are extremely easy to culture. Therefore, coliform bacteria are often used as an indicator group to signify the presence of fecal pathogens that are more difficult to identify, detect, and/or measure.

*Escherichia coli* (*E. coli*) is one such pathogenic species within the coliform group, particularly the total coliforms (see FIG. 1). Of the five general groups of bacteria that comprise the total coliforms, only *E. coli* is generally absent from growing and reproducing naturally in the environment. Instead, *E. coli* is almost exclusively of fecal origin. Consequently, *E. coli* is considered to be the species of coliform bacteria that is the best indicator of fecal contamination and the possible presence of pathogens.

Virulent strains of *E. coli* commonly cause gastroenteritis, urinary tract infections (UTI), and neonatal meningitis. Some types of *E. coli*, particularly the enterohemorrhagic serotype 0157:H7, can cause extremely serious illness and even death. Recent outbreaks of disease caused by *E. coli* 0157:H7 have generated much public concern about this organism.

*E. coli* 0157:H7 typically causes hemorrhagic diarrhea, but can also cause the more serious hemolytic uremic syndrome (HUS) in young children under the age of five, as well as the elderly. HUS causes destruction of red blood cells and subsequent kidney failure. In the U.S., HUS due to *E. coli* 0157:H7 infection is the most common cause of acute kidney failure in children. While most of the reported human cases have been due to eating under cooked hamburger or contaminated salad greens or sprouts, *E. coli* 0157:H7 has been found in cattle, chickens, pigs, and sheep.

While cases of *E. coli* 0157:H7 caused by contaminated drinking water supplies are relatively rare, the serotype is highly virulent, with a very low infectious dose. For example, an *E. coli* 0157 inoculation of only 10 to 100 Colony Forming Units (CFU) is sufficient to cause human or veterinary infection.

Based on current U.S. EPA drinking water guidelines, water containing total coliform or total coliform and *E. coli* is considered unsafe to drink. The EPA has established that the Maximum Contaminant Level Goal (MCLG) for *E. coli* is 0 CFU/L. Thus, the EPA recommends that water contaminated with any amount of *E. coli* or other fecal coliforms should be boiled for 3-5 minutes prior to human consumption or until the water can be disinfected and retested to confirm that bacterial contamination is eliminated. However, conventional EPA-approved testing methods for coliform bacteria and *E. coli* require 100-ml of water per sample, sterile bottles and water, incubators capable of maintaining a temperature of 35±0.5° C., a long wave ultraviolet lamp at 356 nm, and trained laboratory analysts to test and decipher the results.

Accordingly, home testing for water contaminants, such as dangerous chemicals, bacteria (e.g., *E. coli*), and other impurities is an important option that many people consider in order to maintain a contaminant-free home or office. While testing for water contamination by a certified laboratory can result in a more complete and comprehensive analyses, many people are implementing water testing themselves in order to obtain a quick, reliable result while also conserving costs.

This disclosure is directed to address this problem and particularly relates to an apparatus, a kit, and methods for water testing and detection of water contaminants. More specifically, this disclosure relates to a vial, a kit, and one or more methods for detecting microbiological contaminants, such as bacteria, and specifically coliform bacteria, in water and water samples, such as drinking water. An illustrative example of the vial, kit, and method described herein provide qualitative testing results for the presence or absence of coliform bacteria, such as *E. coli*, in drinking water.

The water testing vial, kit, and method described herein are inexpensive, easy-to-use, and provide faster detection, better quality, and accurate results regarding water contamination than previously described water testing kits. In particular, the present water testing vial, kit, and method provide as reliable, if not more reliable results for testing bacteria in water than previously described water testing kits. In addition, the presently described water testing vial, kit, and method do not require any uncommon equipment or supplies, and requires only a minimal amount of test water.

SUMMARY OF THE INVENTION

The present disclosure is directed to a test vial for detecting contaminants in a water sample, the test vial comprising: 1) a vial, wherein the vial comprises a vial sample volume and a water test volume, 2) a cap, 3) media, and 4) a water test sample. The cap of the test vial may be a tamper evident cap. The tamper evident cap of the test vial may comprise an internal seal. The media of the test vial may be LMX, and the test vial may have a shelf life of at least about 12 months.

The presently described test vial may have a water test volume that ranges from about 5 mls to about 100 mls. One embodiment of the test vial may comprise a vial sample volume that is about 30 mls, and a water test volume is about 25 mls. Another embodiment of the test vial may comprise a vial sample volume that is about 120 mls, and a water test volume is about 100 mls. A further embodiment of the test vial may comprise a vial sample volume that is about 6 mls, and a water test volume is about 5 mls.

The contaminants of the present test vial may be bacteria, including numerous coliform bacteria, such as total coliform bacteria. The total coliform bacteria may be selected from the group consisting of *Citrobacter, Enterobacter, Hafnia, Klebsiella*, and *Escherichia*. The *Escherichia* of the present test vial may be *E. coli*, and the *E. coli* of the test vial may be *E. coli* 0157:H.7.

A kit for detecting contaminants in a water sample is also described in the present disclosure. The kit comprises one or more of the test vials described above. Contaminants detected by the kit comprise coliform bacteria, including total coliform bacteria, such as *E. coli*.

A method for detecting contaminants in a water sample using the previously described test vial is also provided herein. The method comprises a step of applying the water sample to the vial, then locking the cap onto the vial to form the test vial. The test vial is then incubated at a temperature ranging from about 20° C. to about 35° C. Finally, a step of enzymatically reacting the contaminants in the water sample to cause a change of color in the media of the test vial is performed. A change of color of the media of the test vial indicates the presence of water contaminants in the water test sample. Contaminants detected by the present method comprise coliform bacteria, including total coliform bacteria, such as *E. coli*.

DETAILED DESCRIPTION OF THE INVENTION

The present disclosure is directed to an apparatus, a test kit, and one or more methods for water testing and detection of contaminants in water. "Water" of the present disclosure may be any kind of water, and specifically comprises freshwater, rain water, sewer water, and well water. In addition, one key embodiment of water of the present disclosure is drinking water.

In one embodiment the apparatus, the kit, and the method of the present disclosure may be used by an EPA-certified laboratory to conduct water testing and detection of water physical properties, including, but not limited to pH, water hardness, solids, etc. In another embodiment, the apparatus, kit, and method of the present disclosure may be used by an individual at a home, office, or commercial location as a do-it-yourself water testing mechanism. For example, a do-it-yourself water test may comprise a user obtaining the water sample, administering the water test, and generating, producing, and/or observing the results of the water test at a home or office site. Specifically, the do-it-yourself water test may be used to detect bacteria, such as total coliforms, particularly, *E. coli*.

For the purpose of the present disclosure, the term "contaminant" includes, but is not limited to, heavy metals, inorganics, volatile and semi-volatile organics, and bacteria. Bacteria detected by the apparatus, the kit, and the method of the present disclosure includes, but is not limited to, total coliforms, such as *Citrobacter, Enterobacter, Hafnia, Klebsiella*, and *Escherichia*. *Escherichia* detected by the present test vial, kit, and method include, but are not limited specifically to, *E. coli*, and *E. coli* 0157:H7. Other bacterial contaminants may also be detected by the vial, kit, or method of the present disclosure.

Figure 2:
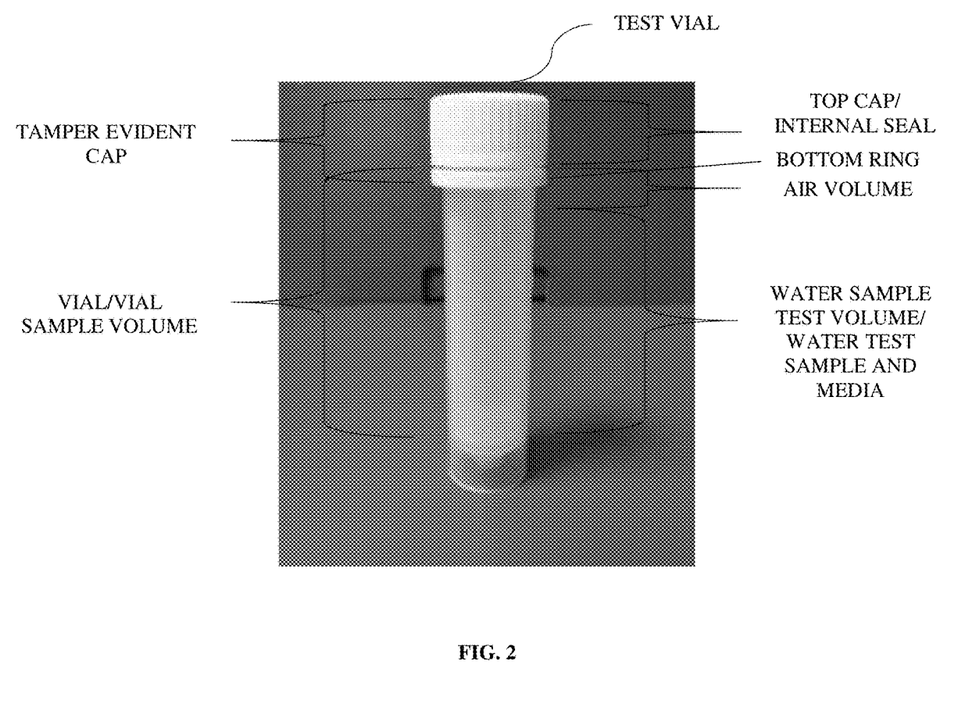
FIG. 2. An illustrative embodiment of a 30 ml Water Test Vial, comprising a 25-ml test volume, media, and a "Tamper Evident" locking cap FIG. 3. An illustrative instruction sheet for the Water Test Vial or Kit demonstrating one or more methods of testing a 25-ml water sample using a 30 ml vial and kit as described herein.

The apparatus or test vial of the present disclosure may comprise a first part that is a vial, flask, or tube (See Example 1 and FIG. 2). An illustrative embodiment of the first part of the apparatus is a vial that may be comprised of glass, plastic, polypropylene, polystyrene, or any combination thereof. The vial dimensions may range from about one inch to about 5 inches in height, and may also be about 3.75 inches tall. The vial dimensions may also range from about 0.25 to about 1 inch in diameter, and may be about 0.75 inches in diameter. An illustrative embodiment of the test vial described herein comprises plastic, and forms a plastic vial.

The apparatus or test vial of the present disclosure may also comprise a second part that is a lid, cap, or seal (See Example 1 and FIG. 2). An illustrative embodiment of the second part of the apparatus is a cap that may be comprised of glass, plastic, polypropylene, polystyrene, or any combination thereof. The cap dimensions may range from about 0.25 inch to about 1 inch in height, and may also be about 0.75 inches tall. The cap dimensions may also range from about 0.25 to about 1 inch in diameter, and may be about 0.75 inches in diameter. An illustrative embodiment of the cap described herein comprises plastic, and forms a plastic cap.

The apparatus or test vial of the present disclosure is properly used when the first part of the apparatus (i.e., the vial) comes in contact with the second part of the apparatus (i.e., the cap) by screwing, twisting, turning, closing or in some manner or fashion locking the cap onto the vial to form a sealed apparatus (i.e., the test vial). The cap of the present disclosure may comprise a special internal seal and/or locking feature that prevent air from getting into the sealed apparatus once the vial and the cap have fully engaged (see Example 1 and FIG. 2). Thus, the internal seal of the cap provides media stability and integrity, which may extend the life and/or integrity of the media for at least about 18 months from production, and generally from about 18 months to about 36 months.

For example, one embodiment of the cap is a "tamper evident" cap (see Example 1). The "tamper evident" cap comprises a first piece, the top cap, and a second piece, the bottom ring (see Example 1 and FIG. 2). When the top cap and bottom ring of the "tamper evidence" cap form a single structure while engaged onto the vial, no evidence of tamper with the test vial has occurred. When the top cap and bottom ring of the "tamper evidence" cap are separated while engaged with the vial (as shown in Example 1), there is evidence that the test vial has been tampered with. Typically, evidence of tamper with the test vial is indicative of addition of a water sample to the vial for testing (see Example 1 and FIG. 2).

The sealed apparatus or test vial comprises a total volume capacity ("total sample volume" or "vial sample volume") and a water sample test volume. The total sample volume (i.e., vial sample volume) is the maximum volume of a water sample or material that may be contained inside of the test vial. The water sample test volume is the volume provided inside of the test vial to comprise a water sample for testing. The water sample may be indicated on or in the vial or test vial by a number, a roman numeral, a shape, a line, an arrow, an "X" or any letter of the alphabet, or any other marking that would provide the user notice of the water test volume limit.

For example, the test vial may have a vial sample volume ranging from 1 ml to 100 mls, 5 mls to 100 mls, 5 mls to 50 mls, from 5 mls to 40 mls, from 10 mls to 100 mls, from 10 mls to 75 mls, and particularly having a total volume of 5 mls, 6 mls, 10 mls, 15 mls, 20 mls, 25 mls, 30 mls, 40 mls, 50 mls, 60 mls, 75 mls, 80 mls, 90 mls, 100 mls, 110 mls, and 120 mls. In addition, the test vial may have a water test volume ranging from 1 ml to 100 mls, 5 mls to 100 mls, 5 mls to 50 mls, from 5 mls to 40 mls, from 10 mls to 100 mls, from 10 mls to 75 mls, and particularly having a water test volume of 5 mls, 6 mls, 10 mls, 15 mls, 20 mls, 25 mls, 30 mls, 40 mls, 50 mls, 60 mls, 75 mls, 80 mls, 90 mls, and 100 mls.

The air volume is the total volume of the test vial minus ("−") the water sample test volume. The air volume may be any remaining volume in the test vial not comprised by a water test sample or media. For example, an illustrative 30 ml test vial of the present disclosure comprises a water sample test volume of 25 mls and an air volume of 5 mls.

The vial portion of the apparatus may comprise media. Specifically, the water sample volume of the vial may comprise media to which a water sample may be added. An illustrative amount of media in the water test vial may range from about 0.05 grams to about 5 grams of media, from about 0.5 grams to about 4 grams of media, from about 0.1 gram to about 3 grams of media, and from about 0.1 grams to about 2 grams of media in the vial.

For example, a specific embodiment of the test vial of the present disclosure comprises a 5 ml water test volume, and also comprises about 0.1 grams of media. Similarly, another embodiment of the test vial of the present disclosure comprises a 25 ml water test volume, and also comprises about 0.5 grams of media. Additionally, an embodiment of the test vial of the present disclosure comprising a 50 ml water test volume, and also comprises about 1 grams of media. Finally, an embodiment of the test vial of the present disclosure comprises a 100 ml water test volume, and also comprises about 2 grams of media.

The media is typically dehydrated, although it may be hydrated as well. When the dehydrated media in the vial is hydrated by addition of a water supply or water test sample, the media provides the necessary nutrients to promote bacterial growth of bacteria present in the water sample or supply.

When placed onto and engaged with the vial, the "tamper evident" cap seals the media inside the test vial, and helps to preserve the high integrity of the media for long periods of time by preventing air from getting into the media. Thus, the cap of the test vial works to extend the shelf life of the media, and ultimately, the water test vial. For example, the vial may have a shelf life of at least about 12 months, and typically ranging from about 12 months to about 48 months, from about 12 months to about 36 months, from about 18 months to about 36 months, from about 18 months to about 24 months, and from about 24 to about 48 months from the date of shipment from the manufacturing facility. Generally, the shelf life of the test vial is at least about 18 months form the date of production.

Media comprised in the vial of the present disclosure is commercially available, such as for example, Colilert® (IDEXX) or Fluorocult® LMX Broth ("LMX"; EMD Millipore), also known as Readycult® Coliforms 100. LMX media readily detects the presence or absence of total coliform bacteria, specifically *E. coli*, in water via two simple enzyme based reactions. First, if total coliforms are present in the water test sample, the bacteria produce an enzyme called beta (β)-galactosidase, which subsequently cleaves the colorless to faintly yellow chromogenic substrate, X-GAL (5-bromo-4-chloro-3-indolyl-β-D-galactopyranoside), to produce a blue-green color. Visual observation of the blue-green color is a positive indication that water contaminants, such as total coliforms, are detected in the water test sample (see Examples 3-6 and FIGS. 4-7).

Second, if *E. coli* bacteria are present in the water test sample, an enzyme called β-glucuronidase may cleave a fluorogenic substrate called MUG (4-methylumbelliferyl-b-D-glucuronide) to produce blue fluorescence in the presence of UV light ranging from about 100 nm to about 400 nm, from about 200 nm to about 400 nm, from about 300 nm to about 400 nm, or at about 365 nm. Visual observation of the blue color under UV light is a positive indication that contaminants, such as *E. coli* and *E. coli* 0157:H7, are presently detected in the water test sample. *E. coli* may also be detected and/or confirmed via other mechanisms, including, but not limited to Kovac's reagent.

LMX media provides some advantages to other commercially available differential broths because it tends to be more stable when hydrolyzed due to moisture in the air.

Specifically, media or broths that utilize an ortho-nitrophenol (OPNG) as a chromogenic substrate to test for β-galactosidase production (e.g., Colilert®) turn yellow upon exposure of coliform bacteria to β-galactosidase. The yellow color indication tends to increase the false positive results when the media is hydrolyzed. LMX broth also hydrolyzes to a yellow color, but this does not interfere with the blue-green color that clearly indicates presence of coliforms (see Examples 3-6 and FIGS. 4-7). In addition, LMX broth has a further advantage over other water testing products, because LMX does not require a color comparator as do clear-to-yellow color-change products, like Colilert®.

The colored endpoint or color change in the vial of the present disclosure provides a clear and definite positive result that is easy to visualize or read, even to inexperienced test users. While no color change indicates that the test is not completed, the change of LMX media from clear to yellow indicates that the test results are negative, no presence of total coliform or *E. coli*. However, a color change from clear or yellow to blue-green indicates a positive results of contamination of the water test sample (see Example 3-6). In particular, a blue, blue/green, or blue/purple color of test solution indicates the presence of total coliform.

*E. coli* may be further identified or detected in the total coliform group. For example, a blue fluorescent color shown in the solution when exposed to a UV lamp indicates the presence of *E. coli*. In addition, a red color, possibly in the form of a ring, is positive indicated of the presence of *E. coli*. The lack of blue fluorescence under a UV lamp or a red colored ring when exposing a water test sample to a UV lamp or Kovac's reagent, respectively, indicate the absence of *E. coli*.

An illustrative embodiment of the apparatus of the present disclosure is a 30 ml vial (i.e., total volume) that comprises a 25-ml test volume (i.e., water sample volume), 0.5 gram of media, and about 5 ml of air volume. Another illustrative embodiment of the present invention is a 6 ml test vial that comprises a 5-ml test volume, 0.1 grams of media, and about 1 ml of air volume. Additional embodiments of the vial described herein comprise a 120 ml vial with a 100-ml test volume and 2.0 grams of media and a 50 ml vial that comprises a 40-ml test volume and about 1.0 gram of media. In each embodiment, locking the cap onto the vial to form the sealed apparatus or test vial provides optimal air volume to promote a quality aerobic reaction between the media and bacteria leading to rapid bacterial growth and faster test results.

Each water test vial may test and/or detect an unlimited number of contaminants, particularly bacterial contaminants. For example, the water test vial may test from about 1 to about 20 contaminants, from about 1 to about 40 contaminants, from about 1 to about 50 contaminants, from about 1 to about 100 contaminants, from about 10 to about 40 or more contaminants, or from about 10 to about 100 or more contaminants. Further, one or more bacterial contaminants or combinations of contaminants of interest to a user or consumer (i.e., "customized contaminants") may also be tested and/or detected by the presently disclosed water test vial.

A kit of the present disclosure used to detect contaminants in water comprises at least one, one or more, two, two or more, six, six or more, twelve, or twelve or more of the water test vials (see Examples 3 and 4). The water test vial(s) of the kit may have any total volume and/or water test volume. For example, one embodiment of the kit of the present disclosure comprises a single 30 ml water test vial comprising a 25-ml water test volume. Another illustrative embodiment of the instant kit comprises twelve, 30 ml water test vials comprising a 25-ml water test volume or only two, 30 ml water test vials. For example, one embodiment of the present kit comprising two water test vials may comprise a water test vial, and an additional water test vial or a bonus test vial.

The bonus test vial may have a total volume and/or a water test volume as previously described above for the test vial total volume and test vial water test volume. For example, the bonus test vial total volume and/or a water test volume may range from about 1 ml to about 100 mls, and may particularly be about 30 mls to about 50 mls. The water test vial may be a bonus water test vial or be in addition to a bonus water test vial comprised in the kit.

Similar to the test vial, the bonus test vial may have an unlimited number of contaminants detected within its water sample, including, bacteria, inorganics, and metals, as described herein. The following contaminants and/or properties are representative of the unlimited number of contaminants and/or properties that may be tested independently, or in combination with other contaminants and/or properties using the bonus test vial:

Inorganics—Nitrate/Nitrite, Fluoride, Chloride, Bromide, and Sulfate.

Physical Properties—Hardness, Tannin/Lignin, Total Dissolved Solids, and pH.

Toxic Metals—Alufrrinum, Antimony, Arsenic, Barium, Beryllium, Cadmium, Calcium, Chromium, Cobalt, Copper, Iron, Lead, Lithium, Magnesium, Manganese, Molybdenum, Nickel, Phosphorus, Potassium, Selenium, Silicon, Silica, Silver, Sodium, Strontium, Thallium, Tin, Vanadium, and Zinc.

The present kit may also comprise additional components to aid in the testing or confirmation of testing results. Such additional components also comprise any necessary reagent, buffer, solution, assay, device, or widget to help perform water testing or confirmation. For example, a UV lamp may be added to the kit of the present disclosure to identify and/or confirm the presence of coliforms, such as *E. coli*. Additionally, aliquots of or Kovac's reagent may be comprised in the water testing kit, since this reagent is also able to confirm the presence of coliform in a less expensive and more commercially practical way than using a UV lamp.

Both the water test vial and the bonus test vial are produced for the ease of users/customers to perform water testing, and thus, may be used as do-it-yourself test vials or may be sent by mail or a carrier into a laboratory by a user for comprehensive water contaminant testing, detection, and/or confirmation of water contaminant results. While test vials are typically purchased by a user in advance, there may be an additional fee or cost passed on to users that is associated with the mail-in laboratory analysis of water samples. The mail-in laboratory service for the test water vial or bonus water test vial also provides a convenient way to follow-up and/or obtain a second opinion to a positive water testing result. The kit of the present disclosure may also comprise other components including, but not limited to, instructions on how to use the test vial, bonus test vial, and/or kit or directions for the mail-in laboratory testing service.

A method of using the test vial and/or kit of the present disclosure to detect water contaminants is also disclosed herein. The method comprises a user to obtain the test vial, remove the cap (e.g. the "tamper evident" cap), and fill the vial with a water test sample of interest. For optimal results, the water test sample should reach, but should not exceed, the water test sample mark indicated on the vial. The water test mark indicates the water test volume on the test vial. For example, a water test sample added to a 30 ml vial should not exceed the water test mark located at the 25 ml volume on the vial.

Once the water test sample has been added, the user places the cap on the vial, and locks it in place to form the test vial. The user shakes the locked test vial for approximately 1-30 seconds, 5-25 seconds, or about 5-10 seconds, or until the media within the water sample is completely in solution.

The test vial should then be incubated at a temperature ranging from about 60° F. to about 120° F. in order to promote bacterial growth within the water test sample. For example, the test vial may be incubated at a temperature ranging from about 20° C. to about 35° C. to promote bacterial growth within the water test sample. In particular, the water test vial may be incubated at room temperature (about 20° C. to about 22° C. or about 68° F. to about 72° F.) from about 24 hours to about 72 hours. Alternatively, the test vial may also be incubated for as little as 24 hours in a standard incubator at a higher temperature ranging from about 23° C. to about 35° C. (or about 73° F. to about 95° F.). The test vial may also be incubated indoors or outdoors, while lying on a flat surface and out of direct sunlight.

The water test is completed when one of two colored endpoints are reached during the given test time period (about 24 hours to about 72 hours). One color indicates a "negative" result, while a different color indicates a "positive" result for water contamination. While any color may denote a "negative" or "positive" water testing result, one illustrative embodiment of the water test vial shows that a yellow color indicates a "negative" result and a blue-green color or a blue color indicates a "positive" result.

EXAMPLES

Illustrative embodiments of the apparatus, kit, and methods for detecting water contaminants of the present disclosure are provided herein by way of examples. One embodiment of the apparatus, kit, and methods of the present disclosure are the Bacteria in Water Test Vial and the Bacteria in Water Test Kit.

It will be appreciated that the apparatuses, kits, and methods described herein have broad applications. The foregoing embodiments were chosen and described in order to illustrate principles of the apparatuses, kits, and methods as well as some practical applications. While certain embodiments have been described and/or exemplified herein, it is contemplated that considerable variation and modification thereof are possible.

The preceding description enables others skilled in the art to utilize methods, kits, and apparatuses in various embodiments and with various modifications as are suited to the particular use contemplated. In accordance with the provisions of the patent statutes, the principles and modes of operation of this disclosure have been explained and illustrated in exemplary embodiments. Accordingly, the present invention is not limited to the particular embodiments described and/or exemplified herein.

Example 1

FIG. 2 shows an illustrative embodiment of a 30 ml Water Test Vial, comprising a 25-ml test volume, media, and a "Tamper Evident" locking cap Example 2

FIG. 3 is an illustrative instruction sheet for the Water Test Vial or Kit demonstrating one or more methods of testing a 25-ml water sample using a 30 ml vial and kit as described herein.

Example 3

To derive the apparatus, kit, and methods described herein, hundreds of tests and comparative studies of various water test vial volumes, water sample volumes, and air volumes were performed to determine which products provided the fastest, most accurate, and cost-effective indication of bacterial water contamination. More specifically, 1) a 120 ml test vial with a 100-ml test volume, 2) a 6 ml vial with a 5-ml test volume, and 3) a 30 ml vial with a 25-ml test volume were compared to determine their ability to detect the presence or absence of coliform bacteria, such as $E.\ coli$. The $E.\ coli$ strain has the advantage of being designated as Biosafety Level 1 (BSL-1) infectious microorganism, and therefore, is routinely used for media testing, antibiotic resistance testing, and as a quality control strain. The $E.\ coli$ cultures were tested for 24-48 hours at two temperatures: 1) 35° C.±0.5° C. (the EPA-approved standard) and 2) room temperature (about 20° C. to 22° C.).

Figure 4:
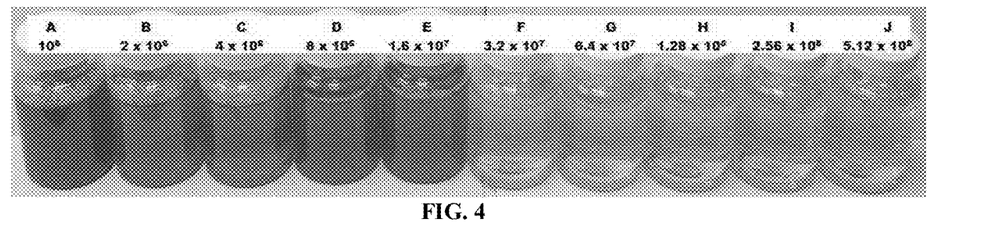
FIG. 4. Visual test results for final *E. coli* dilutions in illustrative embodiments of a 120 ml water test vial with a 100-ml test volume incubated for 24 hours at 35±0.5° C.

As the EPA-approved water testing volume, 100-ml LMX media cultures were inoculated with serial dilutions of $E.\ coli$ (ATCC® 8739™) from EZ-PEC™ (Microbiologics) lyophilized pellets starting at $6.8 \times 10^7$ CFU/pellet. As shown in FIG. 4, the final $E.\ coli$ dilutions were $10^6$ (A); $2 \times 10^6$ (B), $4 \times 10^6$ (C), $8 \times 10^6$ (D), $1.6 \times 10^7$ (E), $3.2 \times 10^7$ (F), $6.4 \times 10^7$ (G), $1.28 \times 10^8$ (H), $2.56 \times 10^8$ (I), and $5.12 \times 10^8$ (J). The cultures were incubated at 35±0.5° C. for 24 hours. Samples A-E of FIG. 4 show a blue-green color indicating a positive result for water contamination, specifically $E.\ coli$ contamination.

Example 4

Figure 5:
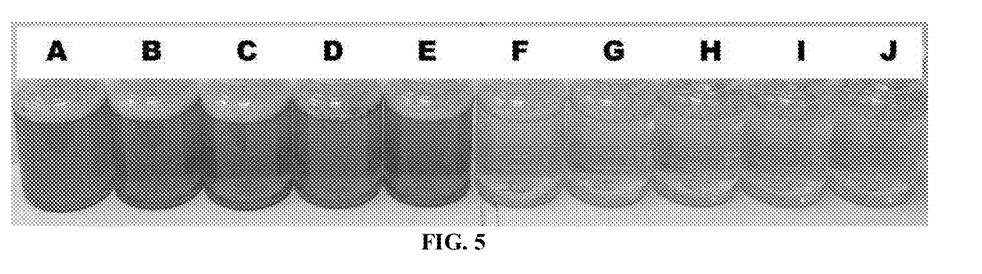
FIG. 5. Visual test results for final *E. coli* dilutions in illustrative embodiments of a 120 ml water test vial with a 100-ml test volume incubated for 48 hours at 35±0.5° C.

As the EPA-approved water testing volume, 100-ml LMX media cultures were inoculated with serial dilutions of $E.\ coli$ (ATCC® 8739™) from EZ-PEC™ (Microbiologics) lyophilized pellets starting at $6.8 \times 10^7$ CFU/pellet. As shown in (FIG. 5), the final $E.\ coli$ dilutions were $10^6$ (A); $2 \times 10^6$ (B), $4 \times 10^6$ (C), $8 \times 10^6$ (D), $1.6 \times 10^7$ (E), $3.2 \times 10^7$ (F), $6.4 \times 10^7$ (G), $1.28 \times 10^8$ (H), $2.56 \times 10^8$ (I), and $5.12 \times 10^8$ (J). The cultures were incubated at 35±0.5° C. for 48 hours. Samples A-E of FIG. 5 show a blue-green color indicating a positive result for water contamination, specifically *E. coli* contamination.

Example 5

Figure 6:
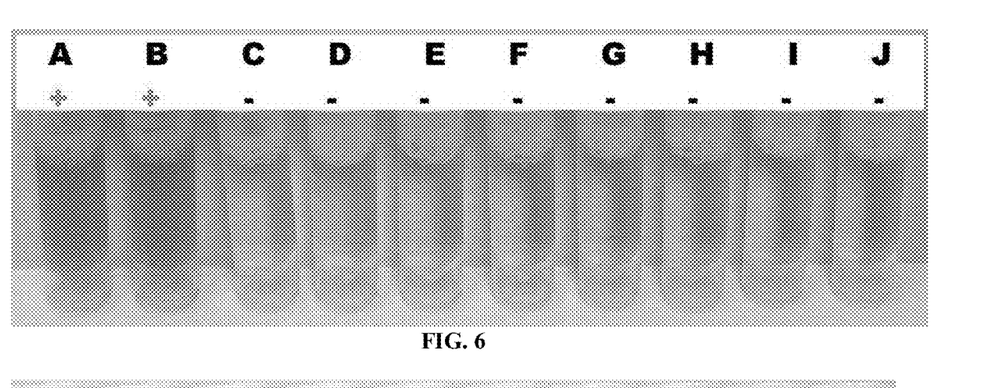
FIG. 6. Visual test results for final *E. coli* dilutions in illustrative embodiments of a 6 ml water test vial with a 5-ml test volume incubated for 24 hours at 35±0.5° C.

5-ml LMX media cultures were inoculated with serial dilutions of *E. coli* (ATCC® 8739™) from EZ-PEC™ (Microbiologics) lyophilized pellets starting at $6.8 \times 10^7$ CFU/pellet. As shown in FIG. 6, the final *E. coli* dilutions were $10^6$ (A); $2 \times 10^6$ (B), $4 \times 10^6$ (C), $8 \times 10^6$ (D), $1.6 \times 10^7$ (E), $3.2 \times 10^7$ (F), $6.4 \times 10^7$ (G), $1.28 \times 10^8$ (H), $2.56 \times 10^8$ (I), and $5.12 \times 10^8$ (J). The cultures were incubated at $35 \pm 0.5°$ C. for 24 hours. Samples A and B of FIG. 6 show a blue-green color indicating a positive result for water contamination, particularly *E. coli* contamination.

Example 6

Figure 7:
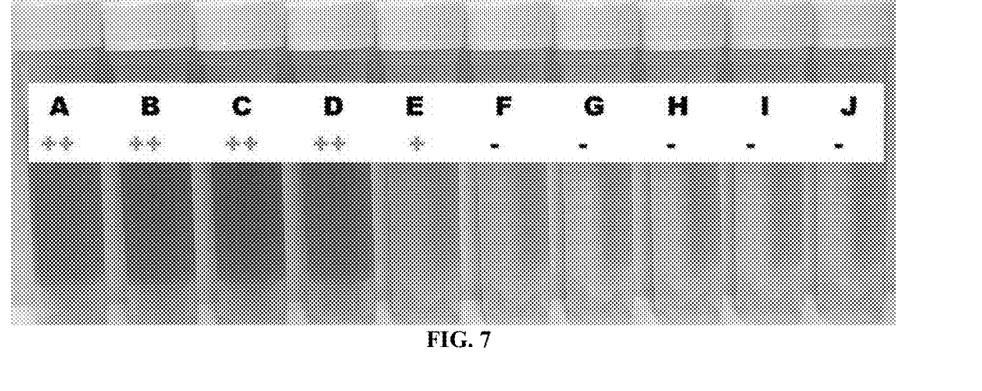
FIG. 7. Visual test results for final *E. coli* dilutions in illustrative embodiments of a 30 ml water test vial with a 25-ml test volume incubated for 24 hours at 35±0.5° C.

25-ml LMX media cultures were inoculated with serial dilutions of *E. coli* (ATCC® 8739™) from EZ-PEC™ (Microbiologics) lyophilized pellets starting at $6.8 \times 10^7$ CFU/pellet. As shown in FIG. 7, the final *E. coli* dilutions were $10^6$ (A); $2 \times 10^6$ (B), $4 \times 10^6$ (C), $8 \times 10^6$ (D), $1.6 \times 10^7$ (E), $3.2 \times 10^7$ (F), $6.4 \times 10^7$ (G), $1.28 \times 10^8$ (H), $2.56 \times 10^8$ (I), and $5.12 \times 10^8$ (J). The cultures were incubated at $35 \pm 0.5°$ C. for 24 hours. Samples A-E of FIG. 7 show a blue-green color indicating a positive result for water contamination, notably *E. coli* contamination.

Figure 8:
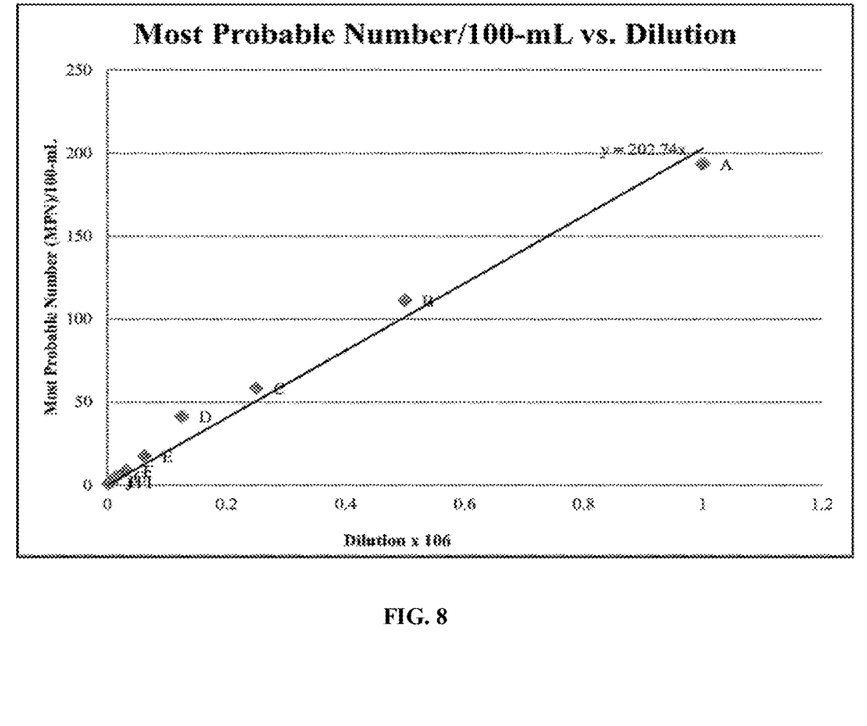
FIG. 8. Graph showing the Most Probable Number (MPN) of *E. coli* bacteria per 100 ml samples of final water sample dilution concentrations (A-J).

The data in FIG. 8 demonstrate that the 25-ml test volume is sufficient for detection of low Most Probable Number (MPN) of *E. coli*, and has significant advantages over the standard 100-ml EPA approved test volume. Advantages of the 25-ml test volume include, but are not limited to, ease-of-use for consumers to handle the test at home, require limited water volume and space to run the test, and is safer to properly dispose of positive cultures The smaller 30-ml vial size also contributed to the reduced cost and reduction of excess materials to dispose of and/or recycle. In fact, the smaller 25-ml test volumes required less media resulting in significantly reduced cost of the test, and thereby providing a cost savings for consumers.

The data of FIG. 8 also show that the 25-ml volume is much more sensitive than the 5-ml volume, and just as sensitive as the 100-ml volume.

Test sample dilution confirmation was obtained by assessing MPN of *E. coli* in each dilution (A-J), which was calculated by analyzing 100-ml of each dilution in Quanti-Tray®/2000 with Colilert® (IDEXX) differential media. The Quanti-Tray®/2000 system is an EPA-approved method of enumerating coliform and *E. coli* in 100-ml sample, providing counts of up to 2,419 CFU/100-ml sample, with a Method Detection Limit (MDL) of 1 MPN/100-ml. As shown in FIG. 8, the highest and lowest dilutions of *E. coli* were detected in the EPA-approved 100-ml sample.

Depending on the initial bacterial inoculum concentration, this data also indicate that room temperature is a sufficient incubation temperature to detect presence or absence of coliforms. However, a longer incubation time of about 48 to 72 hours is typically required at room temperature as compared to 24 hours of incubation at the EPA-approved standard temperature of $35 \pm 0.5°$ C. (FIG. 8). The ability to use the vial, kit or method at room temperature is a noted advantage for average consumers, because it eliminates the need for incubators, which are often costly, require maintenance, and take up a lot of room. In addition, the ability to use the instant water test vial or kit in locations where electricity may be nonexistent, such as in developing countries, or compromised or unreliable, such as barns, wells, or other remote properties or sites is advantageous. Sites of natural disaster, such as tornadoes, hurricanes, or tsunamis, which are frequently responsible for contamination of drinking water sources due to flooding would be ideal circumstances to use the presently described vial, kit, or method.

Accordingly, the 30-ml vial comprising the 25-ml at-home test volume provides unexpected results such that it can be analyzed at standard room temperatures up to the EPA-approved temperature of $35 \pm 0.5°$ C. depending upon availability of equipment and electricity. Further, the 25-ml test volume provides increased sensitivity over the 5-ml test volume and similar to the same sensitivity and accuracy as the 100-ml test volume. However, the 25-ml test volume is faster and less expensive than previous water testing devices. Therefore, the water test vial described herein, including the 30 ml water vial comprising a 25-ml test volume, is a significant improvement over test kits currently available on the market, primarily because of improved sensitivity, ease-of-use, and reduction in the numbers of false negatives (due to low CFU counts) or false positives (due to hydrolyzed media).

Ultimately, the data demonstrates that a 30-ml water test vial with about a 25-ml water test volume provides peak performance with accurate results in a shorter amount of time as compared to the other water testing devices. Water test volumes smaller than about 25 ml (e.g., 5 ml) typically had smaller CFU concentrations which produced more "false negative" results. For example, the 25-ml test volume showed zero "false negatives," unlike the smaller test volumes (e.g., 5-ml test volume), which generated a minimum number of 10 false negatives ranging to as many as 100 false negatives. Larger water test volumes (e.g., 100 ml) provided no greater result accuracy than the 25-ml test volume, but were more expensive and required more media. Thus, the 25-ml test volume was shown to be the optimum test volume for accuracy, dependability, and cost effectiveness of water detection of coliform bacterial contaminants, such as *E. coli*.

It is intended that the scope of disclosure of the present apparatus, kit, and methods be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

The scope of this disclosure should be determined, not only with reference to the above description, but should instead be determined with reference to the appended claims, along with the full scope of equivalents to which such claims are entitled. It is anticipated and intended that future developments will occur in the arts discussed herein, and that the disclosed apparatuses, kits, and methods will be incorporated into such future examples.

Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. It is intended that the following claims define the scope of the disclosure and that the kit, method, and apparatus within the scope of these claims and their equivalents be covered thereby. In sum, it should be understood that the disclosure is capable of modification and variation and is limited only by the following claims.

What is claimed is:

1. A test vial for detecting contaminants in a water sample comprising:
   a) a tamper evident cap comprising a separable top cap, an internal seal, and a bottom ring, and
   b) a vial consisting essentially of a single internal vial sample testing volume that is the sum of the air volume and a water sample test volume,
      wherein the air volume in the vial is at least 16.7% of the single internal vial sample testing volume,
      wherein the water sample test volume is at least 25 mls and consists of a water test sample and media, and
      wherein the media consists essentially of 4-methylumbelliferyl-b-D-glucuronide (MUG), 5-bromo-4-chloro-3-indolyl-β-D-galactopyranoside (XGAL), or combinations thereof.

2. The test vial of claim 1, wherein the water sample test volume ranges from about 25 mls to about 100 mls.

3. The test vial of claim 1, wherein the vial sample volume is about 30 mls, the air volume is about 5 mls, and the water sample test volume is about 25 mls.

4. The test vial of claim 1, wherein the vial sample volume is about 120 mls, the air volume is about 20 mls, and the water sample test volume is about 100 mls.

5. The test vial of claim 1, wherein the contaminants are bacteria.

6. The test vial of claim 5, wherein the bacteria are total coliform bacteria.

7. The test vial of claim 6, wherein the total coliform bacteria are selected from the group consisting of *Citrobacter, Enterobacter, Hafnia, Klebsiella*, and *Escherichia*.

8. The test vial of claim 7, wherein the *Escherichia* bacteria is *E. coli*.

9. The test vial of claim 8, wherein the *E. coli* is *E. coli* O157:H7.

10. The test vial of 1, wherein the media and test vial have a shelf life of at least about 12 months.

11. A kit for detecting contaminants in a water test sample comprising one or more of the test vials of claim 1.

12. The kit of claim 11, wherein the contaminants are total coliform bacteria.

13. The kit of claim 12, wherein the total coliform bacteria is *E. coli*.

14. A method for detecting contaminants in a water sample using the test vial of claim 1, comprising:
   a. locking the tamper evident cap onto the vial to form the test vial,
   b. incubating the test vial at a temperature ranging from about 20° C. to about 35° C.,
   c. enzymatically reacting the contaminants in the water test sample with the 4-methylumbelliferyl-b-D-glucuronide (MUG), the 5-bromo-4-chloro-3-indolyl-β-D-galactopyranoside (XGAL), or combinations thereof in the media to cause a change of color of the media in the water sample test volume,
      wherein the change of color of the media in the water sample test volume indicates a presence of contaminants in the water sample of the test vial.

15. The method of claim 14, wherein the contaminants are total coliform bacteria.

16. The method of claim 15, wherein the total coliform bacteria is *E. coli*.

17. The test vial of claim 1, wherein the vial has dimensions ranging from about 1 inch to about 5 inches in height and from about 0.25 inches to about 1 inch in diameter.

18. The test vial of claim 1, wherein the cap has dimensions ranging from about 0.25 inch to about 1 inch in height and from about 0.25 inches to about 1 inch in diameter.

19. The test vial of claim 1, wherein the media is hydrated or dehydrated.

20. The test vial of claim 10, wherein the media and test vial have a shelf life ranging from about 18 months to about 36 months.

21. The test vial of claim 1, wherein the air volume in the vial is about 20% of the water sample test volume.

22. The test vial of claim 1, wherein the air volume ranges from about 5 mls to about 20 mls.

* * * * *